(12) United States Patent
Wang et al.

(10) Patent No.: US 11,954,108 B2
(45) Date of Patent: Apr. 9, 2024

(54) METHODS AND APPARATUS FOR AUTOMATICALLY RANKING ITEMS IN RESPONSE TO A SEARCH REQUEST

(71) Applicant: Walmart Apollo, LLC, Bentonville, AR (US)

(72) Inventors: Zhenrui Wang, Fremont, CA (US); Siyue Gao, Sunnyvale, CA (US); Ajit Varghese Puthenputhussery, Sunnyvale, CA (US); Manasa Swamy, San Bruno, CA (US); Sachin Adlakha, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/163,371

(22) Filed: Jan. 30, 2021

(65) Prior Publication Data
US 2022/0245162 A1   Aug. 4, 2022

(51) Int. Cl.
*G06F 16/2457* (2019.01)
*G06F 16/248* (2019.01)
*G06N 20/00* (2019.01)

(52) U.S. Cl.
CPC ...... *G06F 16/24578* (2019.01); *G06F 16/248* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,724,571 | A * | 3/1998 | Woods | G06F 16/31 |
| | | | | 707/999.005 |
| 7,599,928 | B2 * | 10/2009 | Smyth | G06F 16/951 |
| | | | | 707/999.005 |
| 10,693,739 | B1 * | 6/2020 | Naseri | G06F 16/29 |

(Continued)

OTHER PUBLICATIONS

Agarwal, Priyanka et al., "Unified Semantic Parsing withWeak Supervision", Proceedings of the 57th Annual Meeting of the Association for Computational Linguistics, Florence, Italy, Jul. 28-Aug. 2, 2019, pp. 4801-4810.

(Continued)

*Primary Examiner* — Yu Zhao
(74) *Attorney, Agent, or Firm* — Morgan, Lewis & Bockius LLP; Manita Rawat

(57) ABSTRACT

This application relates to apparatus and methods for applying trained machine learning models to determine an item's relevance to a search query. In some examples, a query and data identifying a plurality of items are received. Item attributes for each of the plurality of items are obtained, and features are generated based on the item attributes. Further, a score is generated for each item by applying a trained machine learning model to the corresponding features and the query. Matching attributes are determined for each of the plurality of items based on the corresponding item attributes and the query, and the score of each of the plurality of items is adjusted based on the matching attributes. Further, the ranking data is generated based on the adjusted score of each of the plurality of items. The ranking data may be transmitted to a web server for display of the items.

20 Claims, 12 Drawing Sheets

(56) References Cited

U.S. PATENT DOCUMENTS

| | | | |
|---|---|---|---|
| 2007/0083506 A1* | 4/2007 | Liddell | G06F 40/30 707/999.005 |
| 2008/0104071 A1* | 5/2008 | Pragada | G06F 16/24522 |
| 2009/0248657 A1* | 10/2009 | Chellapilla | G06F 16/951 707/999.005 |
| 2010/0082582 A1* | 4/2010 | Gao | G06F 16/9535 707/E17.115 |
| 2010/0169262 A1* | 7/2010 | Kenedy | H04W 12/082 706/50 |
| 2011/0078127 A1* | 3/2011 | Lin | G06F 16/23 707/706 |
| 2011/0113064 A1* | 5/2011 | Govindachetty | G06F 16/9537 707/771 |
| 2012/0265784 A1* | 10/2012 | Hsu | G06F 16/3322 707/E17.014 |
| 2013/0138663 A1* | 5/2013 | Shivashankar | G06Q 10/10 707/748 |
| 2017/0147583 A1* | 5/2017 | Buchmann | G06F 16/24578 |
| 2017/0193072 A1* | 7/2017 | Vase | G06N 20/00 |
| 2018/0157760 A1* | 6/2018 | Garg | G06F 16/9535 |
| 2020/0242123 A1* | 7/2020 | Venkoba | G06F 16/248 |
| 2021/0256367 A1* | 8/2021 | Mor | G06Q 30/0282 |

OTHER PUBLICATIONS

Brenner, Eliot P., "End-to-End Neural Ranking for eCommerce Product Search", SIGIR 2018 eCom, Ann Arbor, Michigan, USA, arXiv:1806.07296v.1, Jun. 19, 2018, 10 pages.

Safranchik, Esteban et al., "Weakly Supervised Sequence Tagging from Noisy Rules", Association for the Advancement of Artificial Intelligence, 2020, 11 pages.

Santu, Shubhra Kanti Karmaker et al., "On Application of Learning to Rank for E-Commerce Search", arXiv:1903.04263v1, Mar. 1, 2019, 11 pages.

Zhang, Hongchun et al., "Improving Semantic Matching via Multi-Task Learning in E-Commerce", Proceedings of the SIGIR 2019 eCom workshop, Paris, France, published at http://ceur-ws.org/Vol-2410/paper2.pdf, Jul. 2019, 7 pages.

* cited by examiner

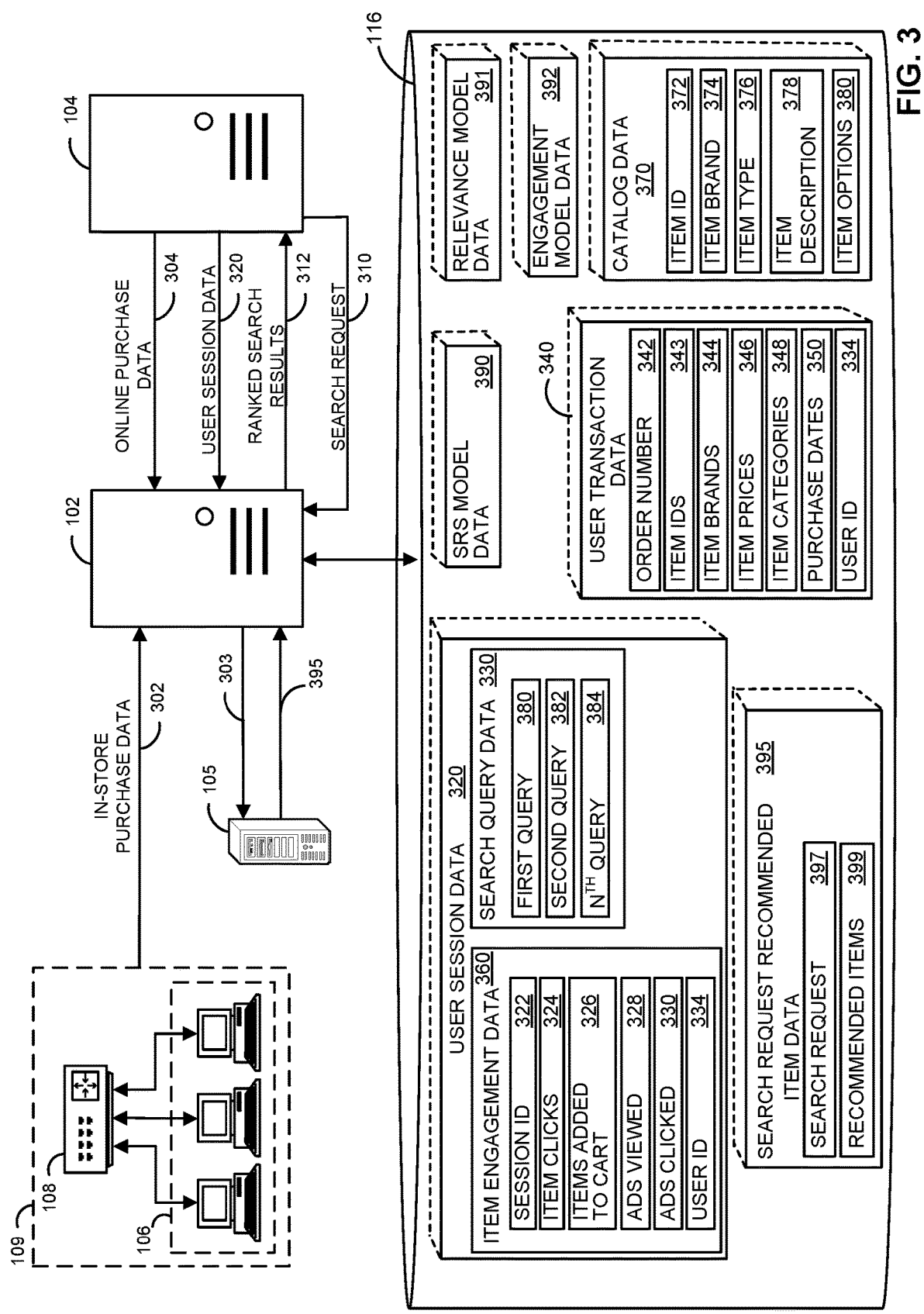

| ITEM ID | ORIGINAL RELEVANCY SCORE | NORMALIZED SCORE | DISCRETIZED SCORE | BRAND MATCH | AGE MATCH | SRS SCORE |
|---|---|---|---|---|---|---|
| A | 10 | 1 | 4 | -1 | -1 | 4-1-1=2 |
| B | 5 | 0.5 | 2 | 1 | -1 | 2-1=1 |
| C | 2 | 0.2 | 1 | -1 | 1 | 1-1=0 |
| D | 8 | 0.7 | 3 | 1 | 1 | 3 |
| E | 1 | 0.1 | 1 | 1 | 1 | 1 |

METHODS AND APPARATUS FOR AUTOMATICALLY RANKING ITEMS IN RESPONSE TO A SEARCH REQUEST

TECHNICAL FIELD

The disclosure relates generally to machine learning processes and, more specifically, to applying machine learning processes to automatically determine item relevance to a search query.

BACKGROUND

At least some websites, such as retailer websites, allow a visitor to search for items. For example, the website may include a search bar that allows the visitor to enter search terms, such as one or more words, that the website uses to search for items. In response to the search terms, the website may display search results determined by a search algorithm, such as a machine learning model, implemented by the website. The search results may identify items that are offered for purchase by the retailer. These search results, however, can have drawbacks. For example, the search results may include items that are irrelevant to the person conducting the search query. In some cases, the search results may include items that do not correspond to the intent of the person conducting the search. In other examples, items that a person would be interested in may appear lower in the search results. As a result, the person conducting the search may need to spend time ignoring irrelevant search results before viewing relevant search results. In addition, although the website may return similar search results to different visitors entering the same search terms, not all visitors entering the same search term are searching for or interested in the same items. As a result, a website visitor conducting a search may need to peruse through many search result items before potentially locating an item they are interested in. As such, there are opportunities to address the determination of search results to a search query to website visitors.

SUMMARY

The embodiments described herein are directed to applying trained machine learning models to generated features to determine an item's relevance to a search query. Search results to the search query may be determined based on the each item's determined relevancy. For example, a search request may be entered in a search bar of a website. In response, the trained machine learning models may be applied to the search query and one or more items to determine search results. The website may then display provided search results. In some examples, more relevant items are displayed before less relevant items. For example, the search results may include a ranking of items, where more relevant items are ranked ahead of less relevant items. The items may then be displayed in ranked order.

The machine learning models may include, for example, relevance models and engagement models. The models may be trained using a weak supervision based approach, such as training the machine learning models with noisy, limited, and imprecise training data. In some embodiments, a trained relevance model is applied to a search query and one or more items to generate a relevance score for each item. The relevance score is then adjusted based on a semantic relevance (SR) score generated for each item. The SR score may be generated based on determining the relevance of one or more of each item's attributes to the search query, such as a brand, an age, a size, or any other suitable item attribute as described herein. In some examples, the items are ranked based on the adjusted relevance score. In some examples, a trained engagement model is applied to the search query and the items to generate an engagement score. The items may then be ranked based on the adjusted relevance score and the engagement score.

In some embodiments, training data is generated that includes query-item pairs whose relevance label has been adjusted based on determining an SR score for each query-item pair. Once trained, the machine learning models may be applied in real-time to determine search results to a search query received from a website. For example, upon receiving a search query, the embodiments may determine an SR score based on a plurality of attributes for each of a plurality of items. A trained machine learning model (e.g., a trained relevance model) is applied to the SR scores and the search query (and, in some examples, additional features) to determine an item relevancy score for each of a plurality of items. The SR scores may be provided to the machine learning model as a weak relevance label for each item. The items may be ranked according to the determined item relevancies generated by the trained machine learning model. For example, the items may be displayed as search results in accordance with the ranking.

In some embodiments, SR scores are generated for a plurality of items for a given search query. The SR scores are compared to a ranking of the plurality of items for the search query. If the SR scores for the plurality of items closely follow the ranking, a relevance label is generated for each item based on the SR score. For example, training data may be generated that includes item and search query pairs labelled with the corresponding SR score. The training data may be stored in a database, and used for training machine learning models. As such, an amount of data sent for human evaluation may be reduced.

Thus, the embodiments may allow a customer to be presented with search results that are more relevant to a customer conducting the search. For example, the embodiments may allow a retailer to present more relevant search results to each customer. The embodiments may also allow a retailer to present items the customer may be interested in earlier in a search result listing. As a result, customer experience with a website may be improved. For example, the customer may more quickly locate an item of interest, which may save the customer time as well as encourage the customer to purchase the item. In addition, because a customer may now spend less time searching for an item, the customer may have additional time to consider additional items for purchase. Further, the embodiments may allow machine learning models to be trained using weak supervision, thus allowing for a larger corpus for training compared to when using traditional supervision methods that require human labelled training data. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device is configured to receive a query and data identifying a plurality of items. The computing device is also configured to obtain first item attributes (e.g., text-based relevance features) for each of the plurality of items, and generate first features based on the first item attributes for each of the plurality of items. Further, the computing device is configured to generate a first score for each of the plurality of items by applying a first machine learning model to the corresponding first features and the query. The first machine learning model may be a relevance model, for example. The computing device is also configured to determine matching attributes for each of the plurality of items based on the corresponding first item attributes and the query, and to adjust the first score of each of the plurality of items based on the matching attributes. Further, the computing device is configured to generate ranking data based on the adjusted first score of each of the plurality of items. The computing device is also configured to transmit the ranking data. For example, the computing device may transmit the ranking data to a web server, and the web server may display the plurality of items in accordance with the ranking identified by the ranking data.

In some examples, the computing device is configured to obtain second item attributes for each of the plurality of items, and generate second features based on the second item attributes for each of the plurality of items. Further, the computing device is configured to generate a second score for each of the plurality of items by applying a second machine learning model to the corresponding second features and the query. The second machine learning model may be an engagement model, for example. In this example, the computing device is configured to generate the ranking data based on the first score and the second score for each of the plurality of items.

In some embodiments, a method is provided that includes receiving a query and data identifying a plurality of items. The method also includes obtaining first item attributes for each of the plurality of items, and generating first features based on the first item attributes for each of the plurality of items. Further, the method includes generating a first score for each of the plurality of items by applying a first machine learning model to the corresponding first features and the query. The method also includes determining matching attributes for each of the plurality of items based on the corresponding first item attributes and the query, and adjusting the first score of each of the plurality of items based on the matching attributes. Further, the method includes generating ranking data based on the adjusted first score of each of the plurality of items. The method also includes transmitting the ranking data. For example, the computing device may transmit the ranking data to a web server, and the web server may display the plurality of items in accordance with the ranking identified by the ranking data.

In some examples, the method includes obtaining second item attributes for each of the plurality of items, and generating second features based on the second item attributes for each of the plurality of items. Further, the method includes generating a second score for each of the plurality of items by applying a second machine learning model to the corresponding second features and the query. In this example, the method includes generating the ranking data based on the first score and the second score for each of the plurality of items.

In yet other embodiments, a non-transitory computer readable medium has instructions stored thereon, where the instructions, when executed by at least one processor, cause a computing device to perform operations that include includes receiving a query and data identifying a plurality of items. The operations also include obtaining first item attributes for each of the plurality of items, and generating first features based on the first item attributes for each of the plurality of items. Further, the operations include generating a first score of each of the plurality of items by applying a first machine learning model to the corresponding first features and the query. The operations also include determining matching attributes for each of the plurality of items based on the corresponding first item attributes and the query, and adjusting the first score of each of the plurality of items based on the matching attributes. Further, the operations include generating ranking data based on the adjusted first score of each of the plurality of items. The operations also include transmitting the ranking data. For example, the computing device may transmit the ranking data to a web server, and the web server may display the plurality of items in accordance with the ranking identified by the ranking data.

In some examples, the operations include obtaining second item attributes for each of the plurality of items, and generating second features based on the second item attributes for each of the plurality of items. Further, the operations include generating a second score for each of the plurality of items by applying a second machine learning model to the corresponding second features and the query. In this example, the operations include generating the ranking data based on the first score and the second score for each of the plurality of items.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 3 is a block diagram illustrating examples of various portions of the item ranking system of FIG. 1 in accordance with some embodiments;

FIG. 10 illustrates a chart with generated relevancy scores, in accordance with some embodiments.

DETAILED DESCRIPTION

Figure 1:
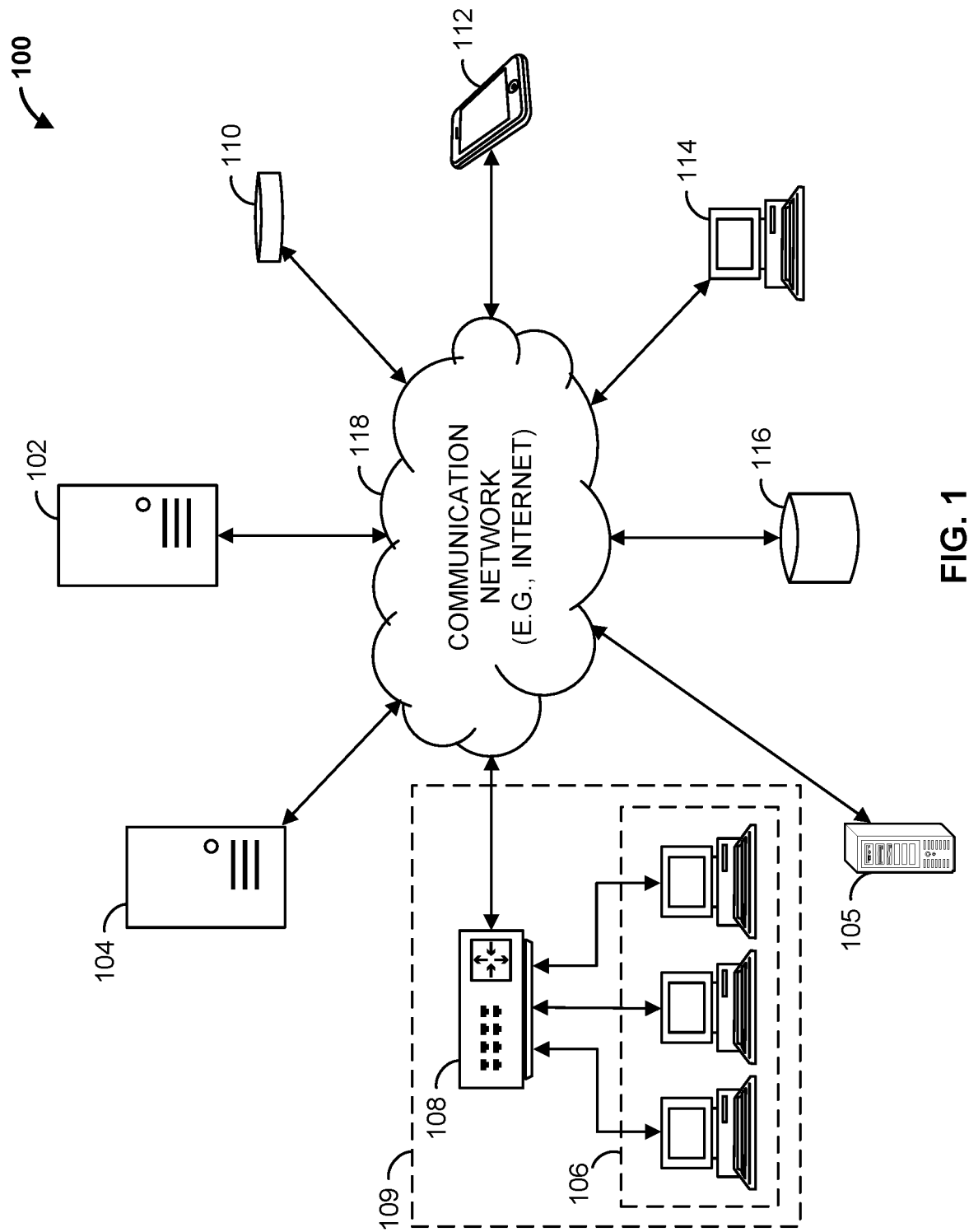
FIG. 1 is a block diagram of an item ranking system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an item ranking system 100 that includes item ranking computing device 102 (e.g., a server, such as an application server), a web server 104, workstation(s) 106, database 116, an item recommendation system 105, and multiple customer computing devices 110, 112, 114 operatively coupled over network 118. Item ranking computing device 102, workstation(s) 106, server 104, item recommendation system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, item ranking computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, item ranking computing device 102 is operated by a retailer, and multiple customer computing devices 112, 114 are operated by customers of the retailer.

Although FIG. 1 illustrates three customer computing devices 110, 112, 114, item ranking system 100 can include any number of customer computing devices 110, 112, 114. Similarly, item ranking system 100 can include any number of workstation(s) 106, item ranking computing devices 102, web servers 104, item recommendation systems 105, and databases 116.

Workstation(s) 106 are operably coupled to communication network 118 via router (or switch) 108. Workstation(s) 106 and/or router 108 may be located at a store 109, for example. Workstation(s) 106 can communicate with item ranking computing device 102 over communication network 118. The workstation(s) 106 may send data to, and receive data from, item ranking computing device 102. For example, the workstation(s) 106 may transmit purchase data related to orders purchased by customers at store 109 to item ranking computing device 102. In some examples, item ranking computing device 102 may transmit, in response to received purchase data, an indication of one or more item advertisements to provide to a customer. For example, the item advertisements may be displayed on a receipt handed to the customer for the purchase order.

In some examples, web server 104 hosts one or more web pages, such as a retailer's website. The website may allow for the purchase of items. Web server 104 may transmit purchase data related to orders purchased on the website by customers to item ranking computing device 102. In some examples, web server 104 transmits user session data to item ranking computing device 102. The user session data identifies events associated with browsing sessions. Web server 104 may also transmit a search request to item ranking computing device 102. The search request may identify a search query provided by a customer. In response, to the search request, item ranking computing device 102 may transmit an indication of one or more item advertisements to display on the website to the purchasing customer. For example, the item advertisements may be displayed on a search results webpage in response to a search query entered by a customer.

First customer computing device 110, second customer computing device 112, and $N^{th}$ customer computing device 114 may communicate with web server 104 over communication network 118. For example, each of multiple computing devices 110, 112, 114 may be operable to view, access, and interact with the website hosted by web server 104. In some examples, the website allows a customer to search for items via, for example, a search bar. A customer operating one of multiple computing devices 110, 112, 114 may access the website via an executed browsing application and perform a search for items on the website by entering in one or more terms into the search bar. In response, the website may return search results identifying one or more items. The website may further allow the customer to add one or more of the items received in the search results to an online shopping cart, and allow the customer to perform a "checkout" of the shopping cart to purchase the items.

Item ranking computing device 102 is operable to communicate with database 116 over communication network 118. For example, item ranking computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to item ranking computing device 102, in some examples, database 116 can be a local storage device, such as a hard drive, a non-volatile memory, or a USB stick. Item ranking computing device 102 may store purchase data received from store 109 and/or web server 104 in database 116. Item ranking computing device 102 may also store user session data identifying events associated with browsing sessions, such as when a customer browses a website hosted by web server 104. In some examples, database 116 stores one or more machine learning models that, when executed by item ranking computing device 102, allow item ranking computing device 102 to determine one or more search results in response to a search query.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Item ranking computing device 102 can execute trained machine learning models (e.g., algorithms) to determine a relevance of an item to a search query. For example, item ranking computing device 102 may receive a search request for a website from web server 104. The search request may identify a search query provided by a customer (e.g., via a search bar on the website). In some examples, item ranking computing device 102 determines an initial set of items for the search request based on the search query. For example, item ranking computing device 102 may apply one or more trained machine learning models to the search query to determine the initial set of items. In some examples, the initial set of items are obtained from a database, such as database 116. In some examples, the initial set of items are obtained from a recommendation system, such as item recommendation system 105. Item recommendation system 105 may be a third-party server that provides item recommendations for a given search query. The initial set of items may, in some examples, be ranked (e.g., include an initial ranking score for each item).

Item ranking computing device 102 may then rank (or re-rank) the initial set of items. For example, each initial relevancy score may be a value 1 to 10, with 10 being the most relevant. In some examples, item ranking computing device 102 normalizes the initial relevancy scores, such as to a value between 0 and 1, inclusive. In some examples, item ranking computing device 102 discretizes the normalized relevancy scores, such as by assigning a value based on a range of normalized scores. For example, based on the normalized values, item ranking computing device 102 may compute a discretized relevancy score between 1 and 4. For example, item ranking computing device 102 may assign a discretized relevancy score of 4 for a normalized score of 1. Similarly, item ranking computing device 102 may assign a discretized relevancy score of 2 for a normalized score of 0.5, a discretized relevancy score of 1 for a normalized score of 0.2, a discretized relevancy score of 3 for a normalized score of 0.7, and a discretized relevancy score of 1 for a normalized score of 0.1.

Item ranking computing device 102 may then adjust the initial ranking scores based on determining whether each of one or more item attributes match the search query. For example, for each item, item ranking computing device 102 may obtain item attributes from database 116. The item attributes may be stored as catalog data. For example, item ranking computing device 102 may obtain a brand, a size (e.g., small, medium, large, 16 ounce, etc.), an age (e.g., toddler, youth, adult, etc.), and a gender associated with each item. Item ranking computing device 102 may determine whether each of the attributes are contained within the search query. For example, if a brand of an item is "Best Brand," item ranking computing device 102 may determine whether "Best Brand" is contained in the search query. In some examples, item ranking computing device 102 performs a textual comparison between each item attribute and the search query to determine whether the search query contains each attribute. Item ranking computing device 102 may adjust the initial ranking score to generate a semantic relevance (SR) score for the item based on whether the item attributes match the search query. For example, if the search query includes an item attribute, the initial ranking score may be increased (e.g., by 1). If, however, the search query does not include the item attribute, the initial ranking score may be decreased (e.g., by 1). By increasing and/or decreasing the initial ranking score based on matching item attributes to the search query, an SR score is generated.

The chart of FIG. 10 illustrates an example of SR scores generated for various items represented by item IDs A, B, C, D, and E. The chart illustrates initial ranking scores ranging in values 1 to 10, normalized relevancy scores ranging from 0 to 1, and discretized relevancy scores ranging from 1 to 4. Further, the chart illustrates an SR score generated based on the discretized relevancy scores and whether each of a brand attribute and an age attribute of each item match a brand or attribute of a search query. For example, although item A had an original relevancy score of 10 and item D had an original score of 8, because item D has a brand and an age attribute that match text within the search query, item D ends up with a higher SR score than item A, which did not have a brand attribute or age attribute that matched text within the search query.

In some examples, SR scores are generated for the items based on tagging terms within the search query, and determining whether the tagged terms correspond to one or more attributes of each item. Item ranking computing device 102 may generate scores based on how many of a search query's tagged terms match one or more attributes of each item. For example, assume a search query from the customer includes "cheddar cheese soup." Item ranking computing device 102 may tag "soup" as a product type, and each of "cheddar" and "cheese" as product type descriptors. Further, assume an item includes a title attribute, and a description attribute. Each of the title attribute and description attribute identify "cheese soup." Item ranking computing device 102 may compute a product type score and a product type descriptor score for the item based on a number of matching attributes (e.g., a textual comparison between the attributes and the tagged search query terms). Each of the scores may be based on a proportion of how many of an item's attributes match a tagged term.

In this example, item ranking computing device 102 may compute a product type score of 1, as the only attribute tagged as product type (i.e., "soup") appears in at least one of the item's title attribute and description attribute (e.g., 1 out of 1 product type term is matched to at least one of the item's title attribute and description attribute, so the calculated proportion is 100%, or 1 on a normalized scale from 0 to 1). In some examples, item ranking computing device 102 may compute a product type descriptor score of 0.5 for "cheddar cheese," as at least one tagged product type descriptor term, "cheese," appears in at least one of the item's title and description, but "cheddar" does not appear in any of the item's title and description (e.g., 1 out of 2 product type descriptor terms is matched to at least one of the item's title attribute and description attribute, so the calculated proportion is 50%, or 0.5).

In some examples, item ranking computing device 102 computes product type descriptor scores based on the number of item attributes a tagged term appears within. For example, item ranking computing device 102 may compute a product type descriptor score of 1 for "cheese," as "cheese" appears in both the item's title attribute and description attribute (e.g., 2 out of 2 attributes, so the calculated proportion is 50%, or 0.5). Item ranking computing device 102 may compute a product type descriptor score of 0 for "cheddar," as "cheddar" does not appear in any of the item's title and description attributes (e.g., 0 out of 2 attributes, so the calculated proportion is 0%, or 0). Although product type and product type descriptor scores are exemplified, in some examples, other attribute scores may also be generated. For example, one or more of a brand, age, gender, size, and color may be tagged within the search query, and are compared with corresponding attributes of an item to generate corresponding scores (e.g., one or more of a brand score, age score, gender score, size score, and color score).

Item ranking computing device 102 may generate the SR score based on the generated attribute scores. For example, item ranking computing device 102 may combine (e.g., add) the generated attribute scores. In some examples, item ranking computing device 102 may adjust the initial ranking score based on the SR score. For example, if an SR score indicates a mismatch (e.g., 0) the initial ranking score may be decreased (e.g., by 1). Otherwise, the initial ranking score is not adjusted. In some examples, the initial ranking score is increased (e.g., by 1, or by the SR score) if the SR score indicates an attribute match.

In some examples, item ranking computing device 102 may generate a final ranking score for each item based on the adjusted initial ranking score and an engagement score corresponding to the item. Item ranking computing device 102 generates the engagement by applying an engagement model to the search query and, in some examples, user session data for a customer.

In some examples, and based on the SR score (e.g., adjusted initial ranking score), item ranking computing device 102 applies one of a plurality of engagement models to the search query to generate an engagement score for an item. For example, and based on the SR score for an item, item ranking computing device 102 may apply a trained engagement model to the search query and user engagement data, such as user engagement data for the customer visiting the website, to generate an engagement score for the item. Item ranking computing device 102 may generate the final ranking score for each item based on the SR score and engagement score corresponding to the item.

In some examples, item ranking computing device 102 generates a blended relevancy score for each item based on each item's corresponding relevancy score (e.g., original relevancy score or discretized relevancy score) and the SR score (e.g., adjusted initial ranking score). For example, the blended relevancy score may be an average of each item's corresponding relevancy score and the SR score. Item ranking computing device 102 may then generate the final ranking score for each item based on the blended relevancy score and engagement score corresponding to the item.

The final ranking score may identify a ranking of the items, indicating their relevance to the search query by the customer. In some examples, item ranking computing device 102 transmits the final ranking scores to the web server 104. Web server 104 may then display search results on the website based on the final ranking scores. For example, web server 104 may display, first in a list of advertisements, an advertisement (e.g., image) for the item with the highest ranking score. Similarly, web server 104 may display advertisements for the remaining items in an order corresponding to their final ranking scores.

In some examples, item ranking computing device 102 labels data with SR scores, and provides the labelled data to one or more machine learning models as a feature. The machine learning model may be a relevance model. For example, item ranking computing device 102 may receive a search query and an initial set of items, and may determine an SR score for each item as described herein. Item ranking computing device 102 may generate feature data identifying each search query and item pair labelled with the SR score, and may provide the generated feature data to the machine learning model. In some examples, item ranking computing device 102 trains the machine learning model with labels (e.g., labelled data). For example, item ranking computing device 102 may label a corpus of historical search queries and corresponding items with generated SR scores (e.g., scores 0 to 4, where 0 indicates not relevant, and 4 indicates highly relevant), and may train a machine learning model, such as a relevance model, with the labelled corpus.

In some examples, item ranking computing device 102 obtains a corpus of historical search queries and corresponding items, and generates SR scores as described herein. Further, item ranking computing device 102 may rank the items based on the SR scores, and compare the ranking to a ranking for the same corpus as provided by, for example, another machine learning model, or by item recommendation system 105. If the rankings coincide (e.g., align), item ranking computing device 102 may label the corpus with the SR scores, and store the labelled corpus in a data repository. The labelled corpus may be used to train machine learning models as described herein. As a result, the amount of corpus sent for human evaluation and labelling may be reduced by these automatic processes.

Figure 2:
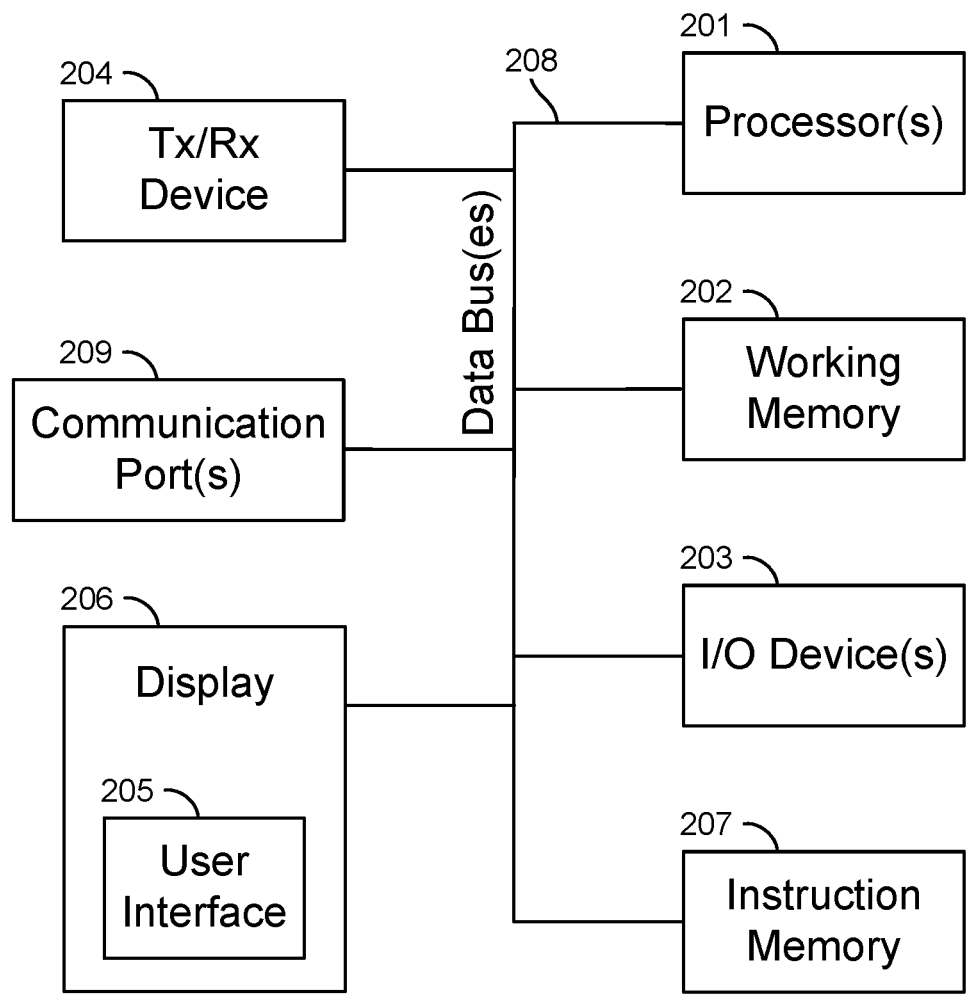
FIG. 2 is a block diagram of an item ranking computing device in accordance with some embodiments.

FIG. 2 illustrates the item ranking computing device 102 of FIG. 1. Item ranking computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item ranking computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning model training data.

Display 206 can display user interface 205. User interfaces 205 can enable user interaction with item ranking computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item ranking computing device 102 will be operating in. Processor(s) 201 is operable to receive data from, or send data to, a network, such as communication network 118 of FIG. 1, via transceiver 204.

FIG. 3 is a block diagram illustrating examples of various portions of the item ranking system 100 of FIG. 1. As indicated in the figure, item ranking computing device 102 may receive user session data 320 from web server 104, and store user session data 320 in database 116. User session data 320 identifies, for each user, data related to a browsing session, such as when browsing a retailer's webpage hosted by web server 104. In this example, user session data 320 includes item engagement data 360 and search query data 330. Item engagement data 360 includes a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, and user ID 334 ID (e.g., a customer ID, retailer website login ID, etc.). Search query data 330 identifies one or more searches conducted by a user during a browsing session (e.g., a current browsing session). In this example, search query data 330 includes first query 380, second query 382, and $N^{th}$ query 384.

Item ranking computing device 102 may also receive in-store purchase data 302 identifying and characterizing one or more purchases from one or more stores 109. Similarly, item ranking computing device 102 may receive online purchase data 304 from web server 104, which identifies and characterizes one or more online purchases, such as from a retailer's website. Item ranking computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item category 348 identifying a category of each item purchased, a purchase date 350 identifying the purchase date of the purchase order, and user ID 334 for the user making the corresponding purchase.

Database 116 may further store catalog data 310, which may identify one or more attributes of a plurality of items, such as a portion of or all items a retailer carries. Catalog data 310 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

In some examples, item ranking computing device 102 may receive a search request 310 identifying and characterizing a search query for a user. The search query may include data identifying and characterizing one or more words, for example. Item ranking computing device 102 may determine an initial set of recommended items for the search query. In some examples, item ranking computing device 102 determines the initial set of recommended items based on applying one or more trained machine learning models to search request 310. In some examples, item ranking computing device 102 determines the initial set of recommended items based on search request recommended item data 395 stored in database 116. Search request recommended item data 395 may identify recommended items 399 for each of a plurality of search requests 397, and may identify an initial ranking of the recommended items 399 (e.g., an initial ranking score for each item).

Search request 397 may be a search request 310 received from web server 104 and stored in database 116. For example, item ranking computing device 102 may receive a search request 310 from web server 104, and may transmit an item recommendation request 303 to item recommendation system 105 that includes the search terms received within search request 310. In response, item recommendation system 105 may determine the initial set of recommended items, and transmit search request recommended item data 395 identifying the initial set of recommended items (e.g., recommended items 399) to item ranking computing device 102. Search request recommended item data 395 may identify a ranking of the initial set of recommended items (e.g., search request recommended item data 395 may include an initial ranking score for each item).

Item ranking computing device 102 may then rank (e.g., re-rank) the initial set of recommended items based on execution of a trained relevance model, a trained engagement model, and a semantic relevance score (SRS) model. For example, item ranking computing device 102 may obtain SRS model data 390, relevance model data 391, and engagement model data 392 from database 116. SRS model data 390 may identify and characterize a model (e.g., algorithm) that generates SRS scores. Relevance model data 391 may identify and characterize a machine learning model that generates relevancy scores, and engagement model data 392 may identify and characterize a machine learning model that generates engagement scores.

For example, item ranking computing device 102 may apply relevance model data 391 to the search query and initial set of recommended items to generate a relevance score for each item. Further, item ranking computing device 102 may apply SRS model data 390 to the search query and initial set of recommended items to generate an SR score for each item. For example, item ranking computing device 102 may obtain attributes for each item from the catalog data 370 stored within database 116, and determine whether one or more terms within the search query match the obtained attributes. Item ranking computing device 102 may adjust the initial ranking score (e.g., as received from item recommendation system 105) of each item based on the number of matching attributes to generate the SR score, as described herein. In some examples, item ranking computing device 102 may normalize the initial ranking scores, and determine a discretized relevancy score for each item based on the normalized score corresponding to the item, as described herein. Item ranking computing device 102 may then adjust the discretized relevancy score based on the number of matching attributes to generate the SR score.

Item ranking computing device 102 may then determine a blended relevance score for each item based on the relevance score and SR score corresponding to the item. For example, item ranking computing device 102 may average the relevance score and the SR score to determine the blended relevance score.

Based on the blended relevance score for each item, item ranking computing device 102 determines a relevancy bucket for each item. For example, each of a plurality of relevancy buckets (e.g., bins) may correspond to a range of blended relevance scores. Item ranking computing device 102 may assign an item to the bucket which includes the item's blended relevance score within its range of blended relevance scores.

Based on the determined relevancy bucket, item ranking computing device 102 applies one of a plurality of engagement models identified by engagement model data 392 to the search query to generate an engagement score for each item. For example, and based on the relevancy bucket for an item, item ranking computing device 102 may apply a trained engagement model to the search query and user engagement data, such as user engagement data for a customer providing the search request, to generate an engagement score for the item. Item ranking computing device 102 may generate an engagement score for each of the initial set of recommended items.

Item ranking computing device 102 may then generate a final ranking score for each of the initial set of recommended items based on the blended relevance score and engagement score corresponding to each item. For example, item ranking computing device 102 may add the blended relevancy score and the engagement score for each item to determine that item's the final ranking score.

Item ranking computing device 102 may then re-rank the initial set of recommended items based on the final ranking scores. Item ranking computing device 102 may transmit ranked search results 312 to web server 104, where ranked search results 312 identifies the re-ranked set of recommended items. Web server 104 may then display advertisements for the set of recommended items based on ranked search results 312.

Figure 4A:
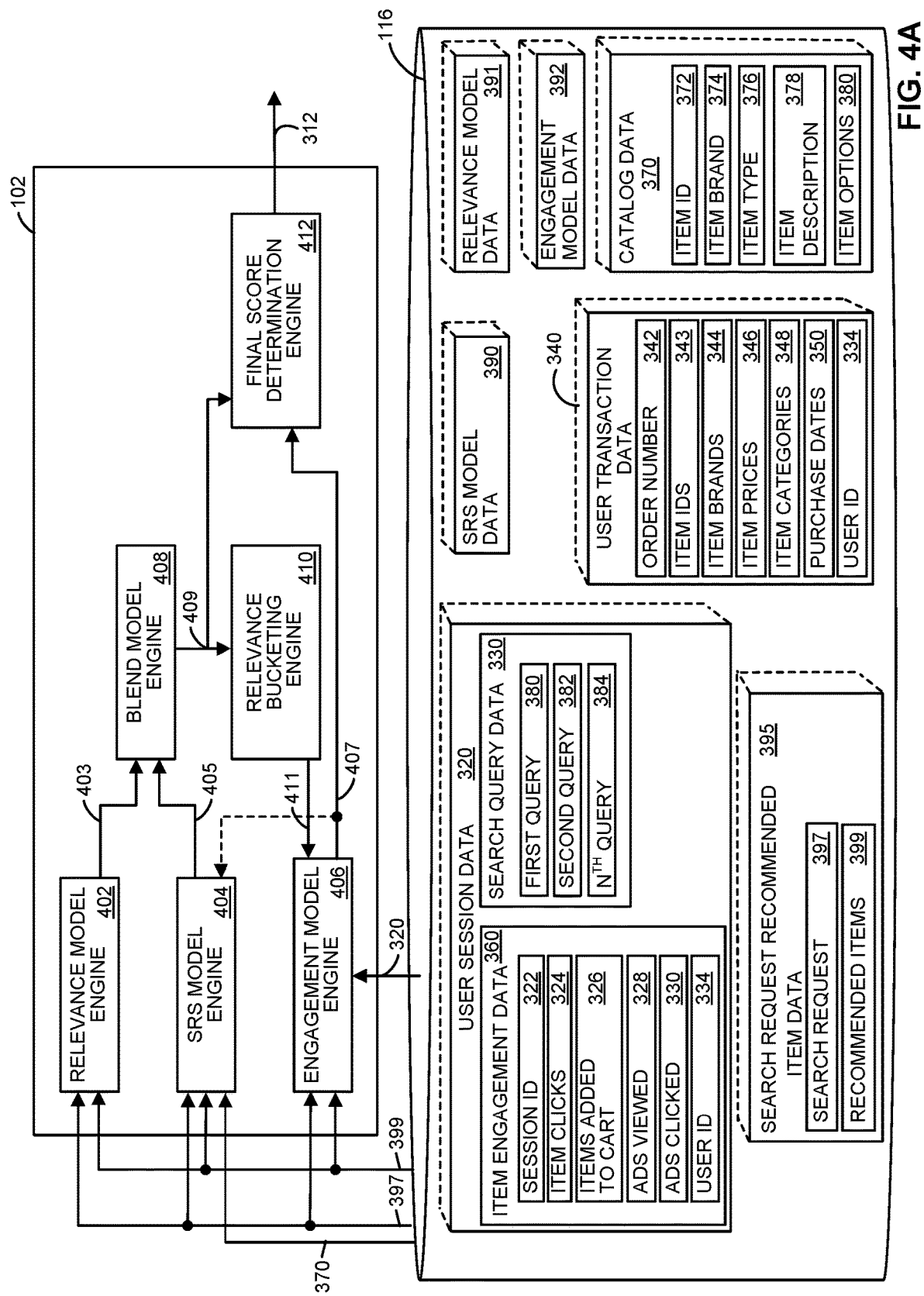
FIG. 4A is a block diagram illustrating examples of various portions of the item ranking computing device of FIG. 1 in accordance with some embodiments.

FIG. 4A illustrates further exemplary portions of the item ranking system 100 of FIG. 1. As indicated in FIG. 4A, item ranking computing device 102 includes relevance model engine 402, SRS model engine 404, engagement model engine 406, blend model engine 408, relevance bucketing engine 410, and final score determination engine 412. In some examples, one or more of relevance model engine 402, SRS model engine 404, engagement model engine 406, blend model engine 408, relevance bucketing engine 410, and final score determination engine 412 may be implemented in hardware. In some examples, one or more of relevance model engine 402, SRS model engine 404, engagement model engine 406, blend model engine 408, relevance bucketing engine 410, and final score determination engine 412 may be implemented as an executable program maintained in a tangible, non-transitory memory, such as instruction memory 207 of FIG. 2, that may be executed by one or processors, such as processor 201 of FIG. 2.

In this example, relevance model engine 402 is configured to execute a relevance model, such as one identified by relevance model data 391. For example, relevance model engine 402 may obtain search request 397 and recommended items 399 from database 116, and may apply a trained relevance model to search request 397 and recommended items 399 to generate a relevance score 403 for each item.

Engagement model engine 406 is configured to execute an engagement model, such as one identified by engagement model data 392. For example, engagement model engine 406 may obtain search request 397, recommended items 399, and user session data 320 (e.g., for the user generating search request 310) from database 116, and may apply a trained engagement model to the search request 397, recommended items 399, and user session data 320 to generate a engagement score 407 for each item. In some examples, engagement model engine 406 executes an engagement model based on relevance bucket 411, which is described further below. For example, engagement model engine 406 may determine an engagement model of a plurality of engagement models that corresponds to relevance bucket 411, and may apply the determined engagement model to search request 397, recommended items 399, and user session data 320.

SRS model engine 404 is configured to execute an SRS model, such as one identified by SRS model data 390. For example, SRS model engine 404 may obtain search request 397 and recommended items 399 from database 116, and may further obtain from database 116 catalog data 370 for each item identified by recommended items 399. SRS model engine 404 may determine a number of matching attributes between search request 397 and the attributes obtained for of each of the recommended items 399, and determine an SR score 405 for each item based on whether the attributes match, as described herein. For example, SRS model engine 404 may increase an initial ranking score of each item if an attribute (e.g., brand, age, gender, color, etc.) matches, and decrease the initial score of the item if an attribute does not match, to generate SR score 405.

In some examples, SRS model engine 404 generates SR scores 405 based on tagging terms within the search query, and determining whether the tagged terms correspond to one or more attributes of each item. SRS model engine 404 may generate scores based on how many of a search queries' tagged terms match one or more attributes of each item, as described herein.

In some examples, SRS model engine 404 increases an item's corresponding SR score 403 if the item has a strong engagement score 407 as determined by engagement model engine 406. For example, SRS model engine 404 may compare the engagement score 407 to a threshold, and increase SR score 403 (e.g., by 1) if the engagement score 407 is at or above the threshold. In some examples, SRS model engine 404 decreases the item's corresponding SR score 403 if the item's engagement score 407 is below the threshold.

Blend model engine 408 receives relevance scores 403 from relevance model engine 402 and SR scores 405 from SRS model engine 404, and determines blended relevance scores 409 based on relevance scores 403 and SR scores 405. For example, blend model engine 408 may determine a blended relevance score 409 for an item based on averaging the relevance score 403 and SR score 405 for the item. In some examples, blend model engine 408 applies a weight to each of the relevance score 403 and SR score 405, and combines the weighted scores to generate blended relevance score 409. For example, blend model engine 408 may apply a first weight to relevance score 403, a second weight to SR score 405, and add the weighted scores to generate blended relevance score 409. The weights may be user configurable and stored in database 116, for example.

Relevance bucketing engine 410 receives blended relevance score 409, and determines a relevance bucket 411 based on the blended relevance score 409. For example, relevance bucketing engine 410 may determine a plurality of buckets, each bucket associated with a range of blended relevance scores. Relevance bucketing engine 410 may determine which of the plurality of buckets the received blended relevance score 409 falls within, and generate relevance bucket 411 identifying the determined bucket (e.g., via a bucket number). Relevance bucketing engine 410 provides relevance bucket 411 to engagement model engine 406 for selection of an engagement model, as described further above.

Final score determination engine 412 receives blended relevance score 409 from blend model engine 408, and engagement score 407 from engagement model engine 406. Final score determination engine 412 generates ranked search results 312 based on blended relevance scores 409 and engagement scores 407. For example, final score determination engine 412 may add blended relevance score 409 and engagement score 407 for each item to generate that item's final ranking score. Final score determination engine 412 may determine a final ranking score for each of the recommended items 399, and generate ranked search results 312 based on the final ranking scores. In some examples, final score determination engine 412 applies a weight each of the blended relevance score 409 and engagement score 407, and combines the weighted scores to generate the final ranking score for an item. The weights may be user configurable and stored in database 116, for example.

Figure 4B:
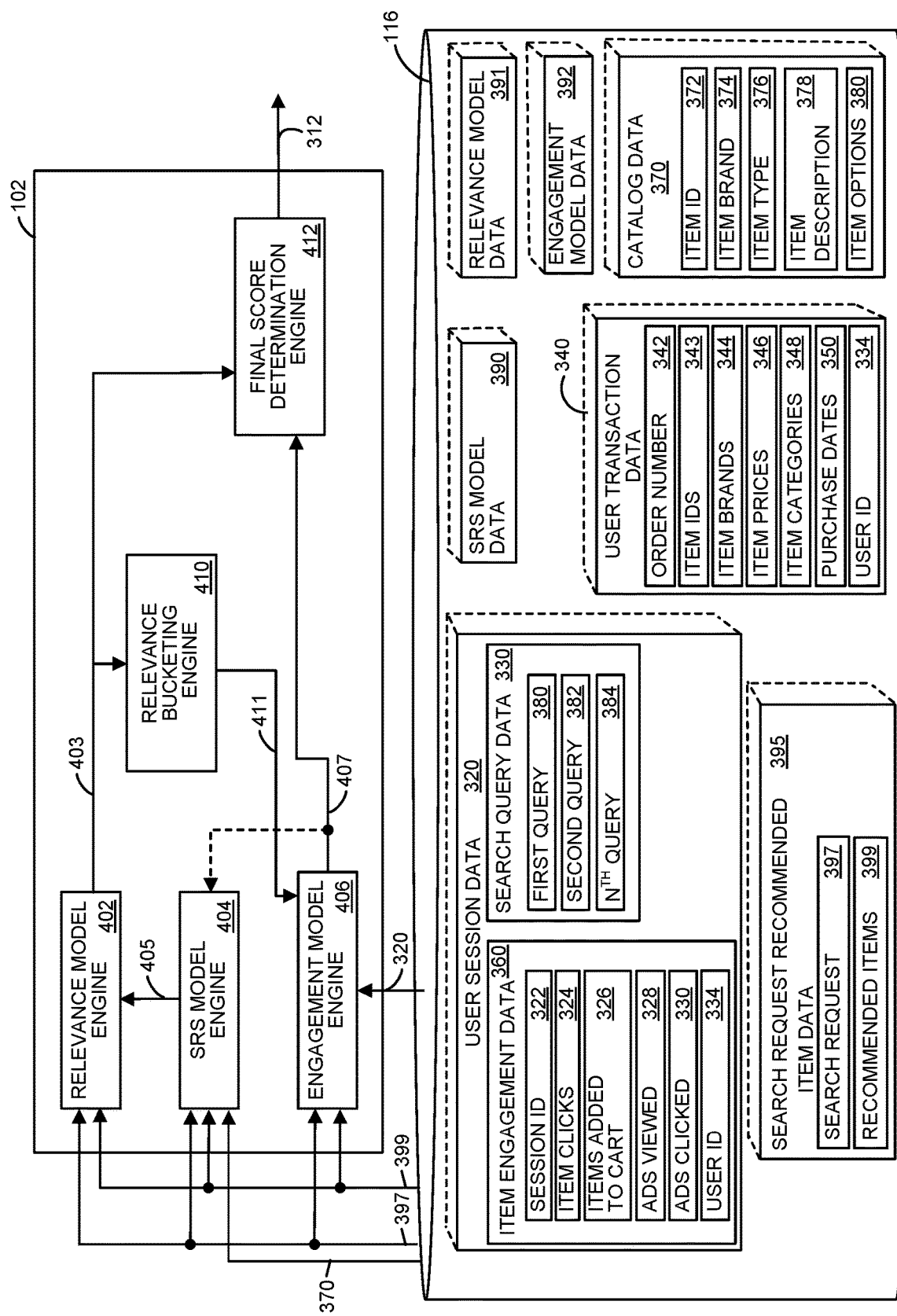
FIG. 4B is a block diagram illustrating examples of various portions of the item ranking computing device of FIG. 1 in accordance with some embodiments.

FIG. 4B illustrates further exemplary portions of the item ranking system 100 of FIG. 1. In this example, SRS model engine 404 generates SR scores 405 as described above with respect to FIG. 4A, but provides the SR scores 405 to relevance model engine 402 as features. Relevance model engine 402 may apply the relevance model to search request 397, recommended items 399, and SR scores 405 to generate the relevance score 403 for each item. In some examples, SR score 405 includes data (e.g., vector) identifying search request 397 and recommended item 399 pairs, along with the generated SR score.

Further, in this example, relevance bucketing engine 410 determines the relevance bucket 411 for an item based on relevancy score 403 received from relevance model engine 402. For example, relevance bucketing engine 410 may determine a plurality of buckets, each bucket associated with a range of blended relevance scores. Relevance bucketing engine 410 may determine which of the plurality of buckets the received relevance score 403 falls within, and generate relevance bucket 411 identifying the determined bucket (e.g., via a bucket number). Relevance bucketing engine 410 provides relevance bucket 411 to engagement model engine 406 for selection of an engagement model, as described herein.

Final score determination engine 412 receives relevancy score 403 from relevance model engine 402, and engagement score 407 from engagement model engine 406. Final score determination engine 412 generates ranked search results 312 based on relevancy score 403 and engagement scores 407. For example, final score determination engine 412 may add relevancy score 403 and engagement score 407 for each item to generate that item's final ranking score. Final score determination engine 412 may determine a final ranking score for each of the recommended items 399, and generate ranked search results 312 based on the final ranking scores.

Figure 5A:
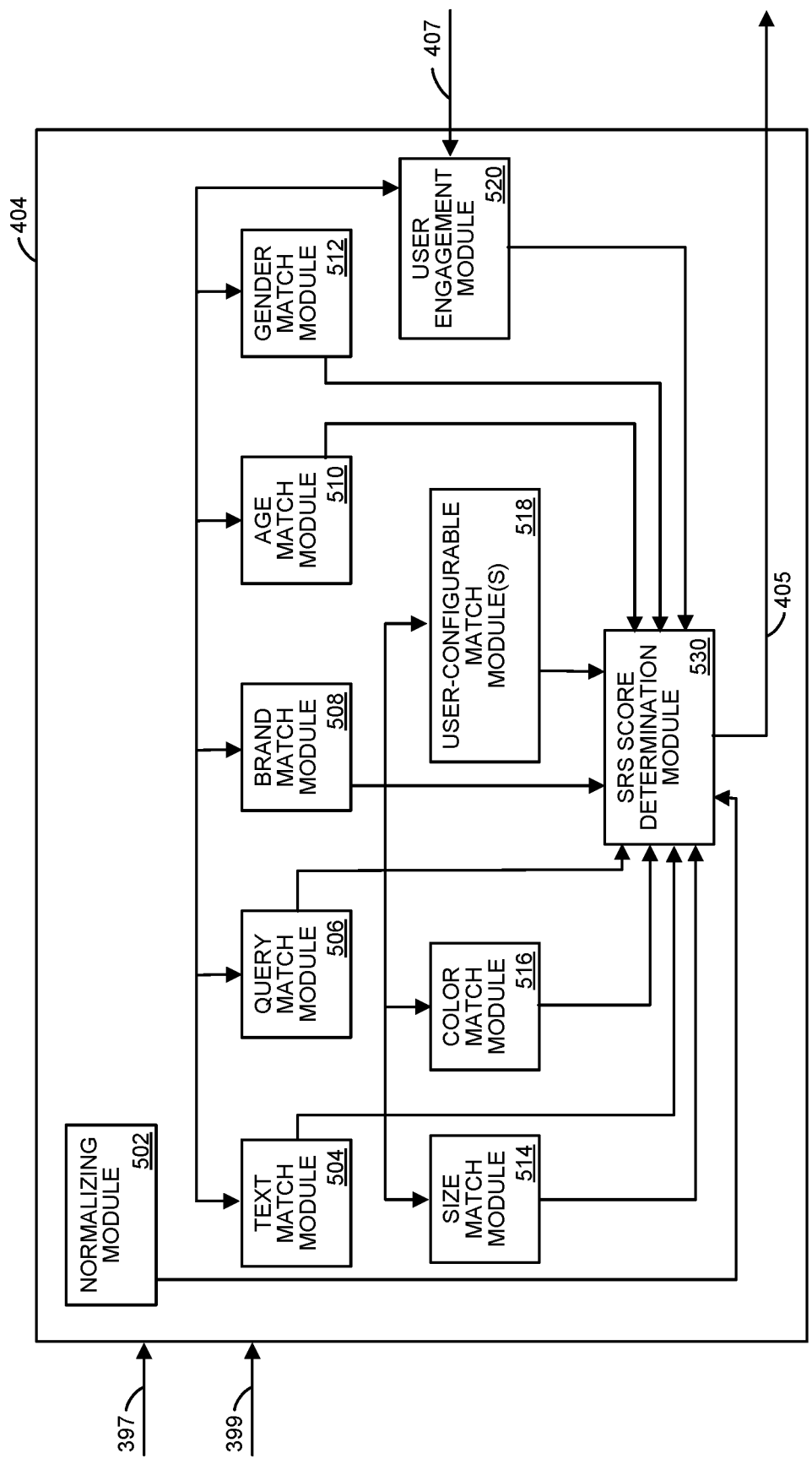
FIG. 5A is a block diagram of an semantic relevance score (SR) model engine in accordance with some embodiments.

FIG. 5A illustrates an example of SRS model engine 404. In this example, SRS model engine 404 includes a plurality of modules. Each of the modules may be implemented in hardware, or as an executable program maintained in a tangible, non-transitory memory, such as instruction memory 207 of FIG. 2, that may be executed by one or processors, such as processor 201 of FIG. 2. As illustrated, SRS model engine 404 includes a normalizing module 502 that may receive an initial ranking of items as defined within recommended items 399, and normalizes the initial ranking values. For example, normalizing module 502 may normalize the initial ranking values each to a value between 0 and 1, inclusive. Normalizing module 502 may provide the normalized ranking values to SRS score determination module 530.

SRS score determination module 530 adjusts the normalized ranking values based on signals received from each of text match module 504, query match module 506, brand match module 508, age match module 510, gender match module 512, size match module 514, color match module 516, user-configurable match module(s) 518, and user engagement module 520. Each signal may identify, for example, whether to increase, or decrease, the normalized ranking value for each item.

Text match module 504 determines whether the search request 397 matches (e.g., includes) a description of the item. For example, text match module 504 may obtain a description attribute for the item from catalog data 370 stored in database 116, and determine if the obtained description includes the search request 397 terms. If the search request 397 matches the description, text match module 504 generates the signal to increase the normalized ranking value for an item. If the search request 397 does not match the description, text match module 504 generates the signal to decrease the normalized ranking value for the item.

Query match module 506 determines whether the search request 397 matches (e.g., includes) a title of the item. For example, query match module 506 may obtain a title attribute for the item from catalog data 370 stored in database 116, and determine if the obtained title is contained within the search request 397. If the search request 397 matches the title, query match module 506 generates the signal to increase the normalized ranking value for an item. If the search request 397 does not match the title, query match module 506 generates the signal to decrease the normalized ranking value for the item.

Brand match module 508 determines whether the search request 397 matches (e.g., includes) a brand of the item. For example, brand match module 508 may obtain a brand attribute for the item from catalog data 370 stored in database 116, and determine if the obtained brand is contained within the search request 397. If the search request 397 matches the brand, brand match module 508 generates the signal to increase the normalized ranking value for an item. If the search request 397 does not match the brand, brand match module 508 generates the signal to decrease the normalized ranking value for the item.

Age match module 510 determines whether the search request 397 matches (e.g., includes) an age of the item. The age may be, for example, "youth," "adults," "toddler," or any other suitable age term(s). For example, age match module 510 may obtain an age attribute for the item from catalog data 370 stored in database 116, and determine if the obtained age is contained within the search request 397. If the search request 397 matches the age, age match module 510 generates the signal to increase the normalized ranking value for an item. If the search request 397 does not match the age, age match module 510 generates the signal to decrease the normalized ranking value for the item.

Gender match module 512 determines whether the search request 397 matches (e.g., includes) a gender of the item. For example, gender match module 512 may obtain a gender attribute for the item from catalog data 370 stored in database 116, and determine if the obtained gender is contained within the search request 397. If the search request 397 matches the gender, gender match module 512 generates the signal to increase the normalized ranking value for an item. If the search request 397 does not match the gender, gender match module 512 generates the signal to decrease the normalized ranking value for the item.

Size match module 514 determines whether the search request 397 matches (e.g., includes) a size of the item. For example, size match module 514 may obtain a size attribute for the item from catalog data 370 stored in database 116, and determine if the obtained size is contained within the search request 397. If the search request 397 matches the size, size match module 514 generates the signal to increase the normalized ranking value for an item. If the search request 397 does not match the size, size match module 514 generates the signal to decrease the normalized ranking value for the item.

Color match module 516 determines whether the search request 397 matches (e.g., includes) a color of the item. For example, color match module 516 may obtain a color attribute for the item from catalog data 370 stored in database 116, and determine if the obtained color is contained within the search request 397. If the search request 397 matches the color, color match module 516 generates the signal to increase the normalized ranking value for an item. If the search request 397 does not match the color, color match module 516 generates the signal to decrease the normalized ranking value for the item.

User configurable match module(s) 518 may also generate a signal to increase, or decrease, the normalized ranking value for an item. A user operating item ranking computing device 102 may provide input via user interface 205 to select an attribute for which to match to the search request 397. If the search request 397 matches the selected attribute, user configurable match module(s) 518 generates the signal to increase the normalized ranking value for the item. Otherwise, if the search request 397 does not match the selected attribute, user configurable match module(s) 518 generates the signal to decrease the normalized ranking value for the item.

User engagement module 520 generates a signal to increase the normalized ranking value for an item when the item has a strong engagement score 407. For example, user engagement module 520 may compare the engagement score 407 to a threshold, and generate the signal to increase the normalized ranking value if the engagement score 407 is at or above a threshold. In some examples, user engagement module 520 generates the signal to decrease the normalized ranking value if the engagement score 407 is below the threshold. A user operating item ranking computing device 102 may configured the threshold via, for example, user interface 205.

SRS determination module 530 adjusts the normalized ranking value received from normalizing module 502 based on the received signals. For example, if a signal indicates to increase the normalized ranking value, SRS determination module 530 increase the normalized ranking value. Otherwise, if a signal indicates to decrease the normalized ranking value, SRS determination module 530 decreases the normalized ranking value. In some examples, SRS determination module 530 determines a first total number of signals indicating to increase the normalized ranking value, and a second total number of signals indicting to decrease the normalized ranking value. SRS determination module 530 determines the larger of the first total number and the second total number, and subtracts the smaller of the first total number and the second total number from the larger of the first total number and the second total number. If the larger number is the first total number, SRS determination module 530 increases the normalized ranking value by the determined difference. If the larger number is the second total number, SRS determination module 530 decreases the normalized ranking value by the determined difference.

Figure 5B:
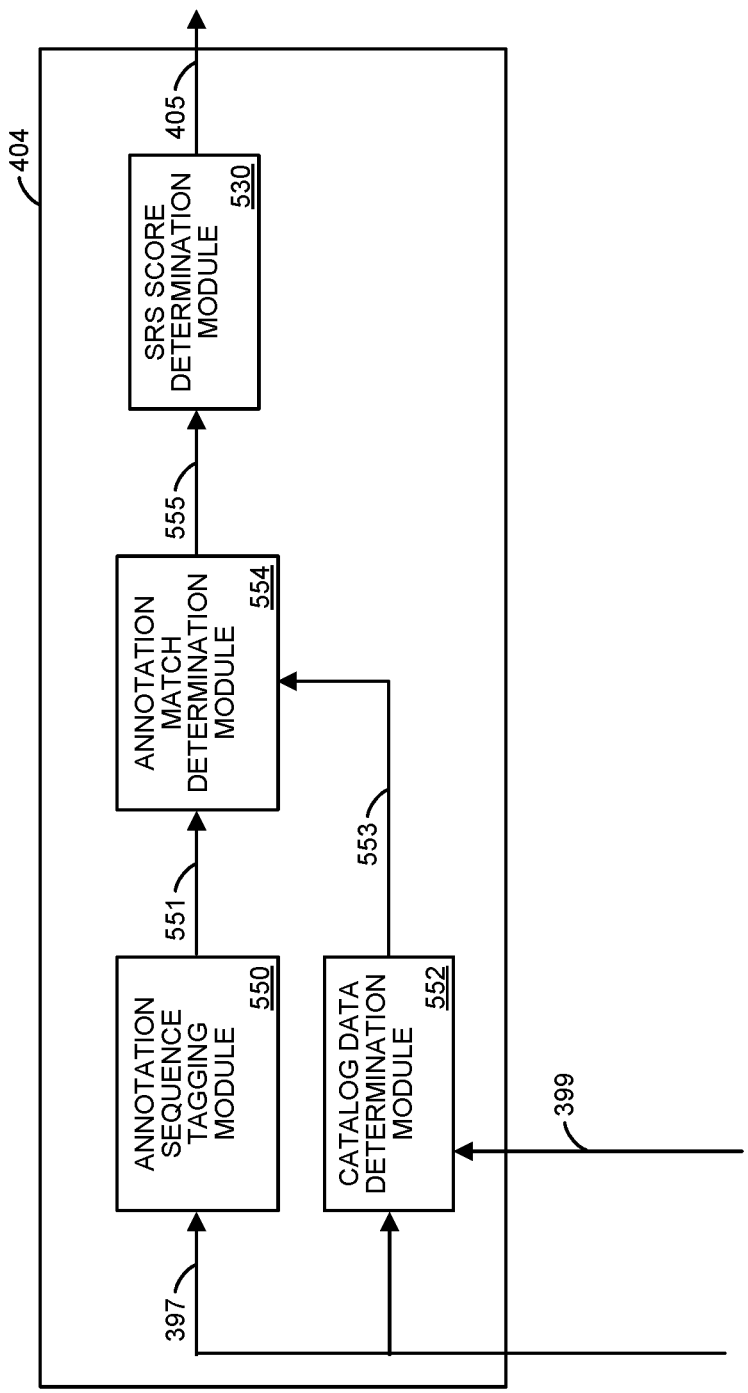
FIG. 5B is a block diagram of an semantic relevance score (SR) model engine in accordance with some embodiments.

FIG. 5B illustrates another example of the of SRS model engine 404. In this example, SRS model engine 404 includes annotation sequence tagging module 550, catalog data determination module 552, annotation match determination module 554, and SRS score determination module 530. Each of the modules may be implemented in hardware, or as an executable program maintained in a tangible, non-transitory memory, such as instruction memory 207 of FIG. 2, that may be executed by one or processors, such as processor 201 of FIG. 2.

Annotation sequence tagging module 550 identifies and tags terms within search request 397. For example, annotation sequence tagging module 550 may tag a term as a product type, a product type descriptor, a brand, an age, a size, a color, or any other attribute. Annotation sequence tagging module 550 determines the tags, and generates tag data 551 identifying the terms and associated tags. Catalog determination module 552 receives search request 397 and recommended items 399, and obtains, from catalog data 370 stored in database 116, item attributes 553 for each item of the recommended items 399.

Annotation match determination module 554 receives tag data 551 and item attributes 553, and determines whether the item attributes 553 correspond (e.g., match) to any tagged terms identified within tag data 551. Annotation match determination module 554 generates matching data 555 identifying item attributes 553 determined to match to tagged terms.

SR score determination module 530 receives the matching data 555, and generates SR scores 405 based on how many of a search query's tagged terms match one or more attributes of each item. For example, SR score determination module 530 may generate a product type score for a product type attribute that is matched to a tagged term, or a product type descriptor score for a product type descriptor attribute that is matched to a tagged term. SR score determination module 530 may combine the combined attribute scores to generate SR score 405.

Figure 6:
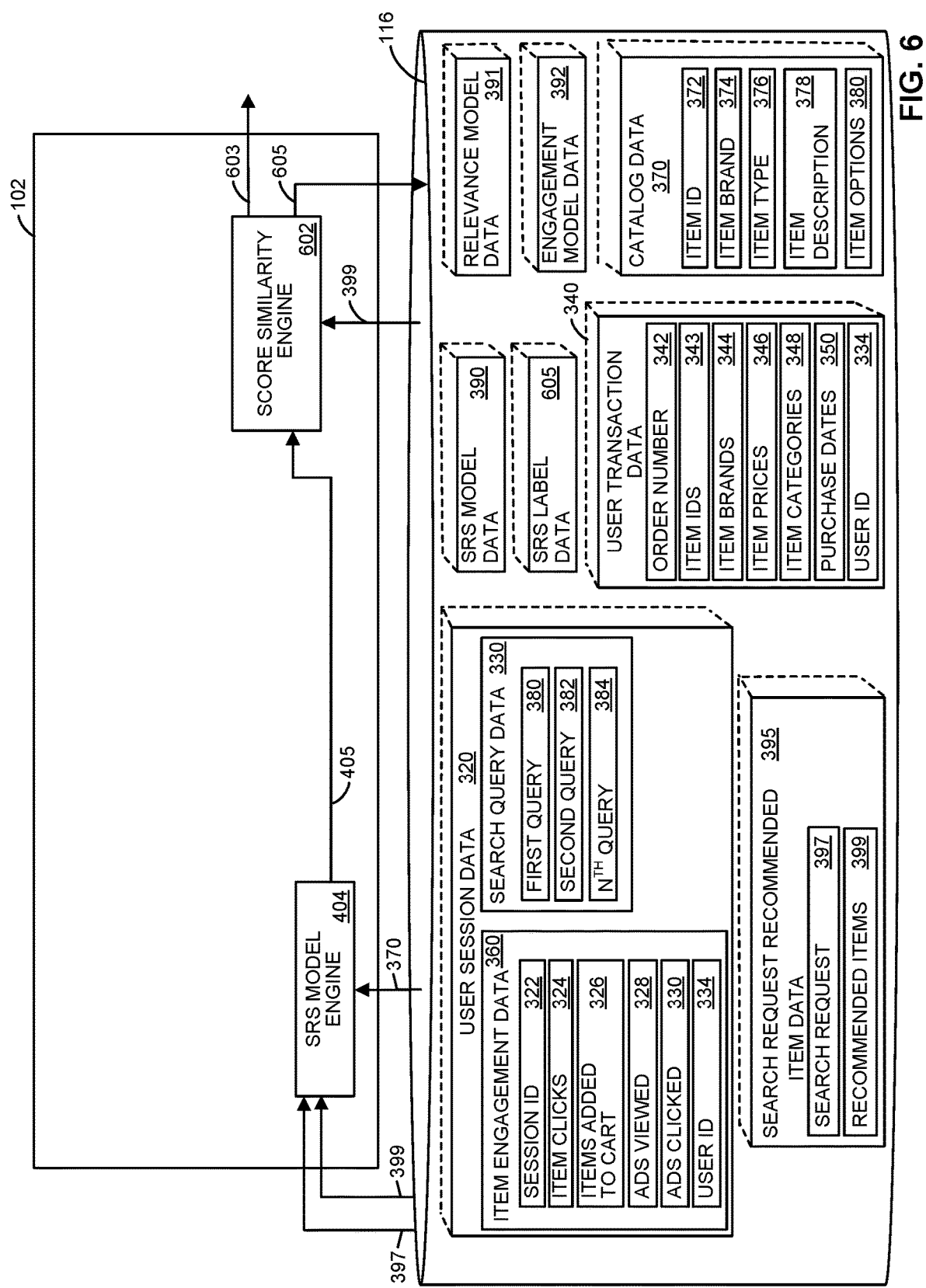
FIG. 6 is a block diagram illustrating examples of various portions of the item ranking system of FIG. 1 in accordance with some embodiments.

FIG. 6 illustrates exemplary portions of the item ranking system 100 of FIG. 1. In this example, SRS model engine 404 obtains search request 397 and corresponding recommended items 399 from database 116. SRS model engine 404 generates SR scores 405 for each recommended item 399 as described above with respect to FIG. 5A or FIG. 5B, for example. Score similarity engine 602 receives SR scores 405 from SRS model engine 404, and further obtains recommended items 399 from database 116.

In some examples, recommended items 399 are determined based on receiving search request recommended item data 395 from item recommendation system 105 for a corresponding search request 397. For example, score similarity engine 602 may initiate an item recommendation request 303, and transmit item recommendation request 303 (e.g., via transceiver device 204) to item recommendation system 105. In response to the request, SRS model engine 404 may receive (e.g., via transceiver device 204) search request recommended item data 395 from item recommendation system 105, and store the search request recommended item data 395 as recommended items 399 within database 116.

SRS model engine 404 may perform operations to determine whether the item rankings identified by recommended items 399 align with the item rankings identified by the SR scores 405. For example, SRS model engine 404 may determine if the items are ranked in a same order. In some examples, alignment is determined by directly comparing the output SR score with a relevance prediction score from another machine learning model. In some examples, alignment is determined by comparing a ranking generated from sorting the same set of items by SR score and another machine learning model, and computing metrics, such as computing a ranking correlation. If the ranking correlation is at or above a threshold, for example, the rankings align. Otherwise, if the ranking correlation is not above the threshold, the rankings do not align.

If the rankings align (e.g., coincide), item ranking computing device 102 generates SRS label data 605, which includes search query item pair data (e.g., identifying the search query and item) labelled with the corresponding SR score 405. Score similarity engine 602 may store the SRS label data 605 within database 116. Item ranking computing device 102 may train a machine learning model, such as a relevancy model identified by relevance model data 391, with the SRS label data 605.

Otherwise, if the rankings do not align, SRS model engine 404 may generate an evaluation request 603 identifying the search request and corresponding item. The evaluation request 603 may be transmitted to another computing device, where a person may analyze the search request and corresponding item to determine a label for the search request and item pair.

Figure 7:
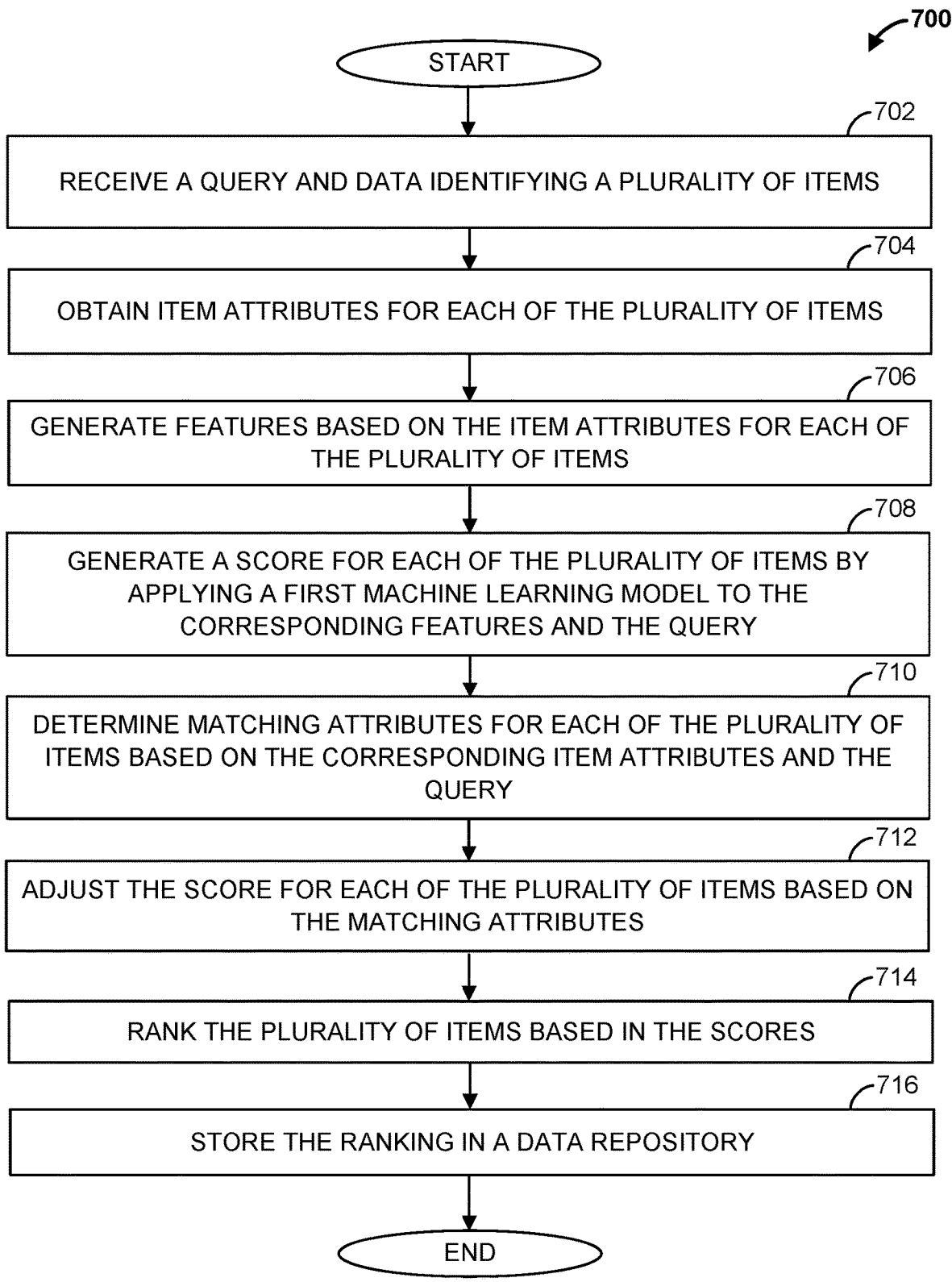
FIG. 7 is a flowchart of an example method that can be carried out by the item ranking system of FIG. 1 in accordance with some embodiments.

FIG. 7 is a flowchart of an example method 700 that can be carried out by the item ranking system 100 of FIG. 1. Beginning at step 702, a computing device, such as item ranking computing device 102, receives a query and data identifying a plurality of items. For example, item ranking computing device 102 may receive search request 310, which identifies a search query, and may also receive search request recommended item data 395 identifying the plurality of items. At step 704, item attributes for each of the plurality of items are obtained. For example, item ranking computing device 102 may retrieve item attributes for each item from catalog data 370 stored in database 116. At step 706, features are generated based on the item attributes for each of the plurality of items. For example, item ranking computing device 102 may generate features for an engagement model, and a relevancy model.

Proceeding to step 708, a score for each of the plurality of items is generated based on applying a first machine learning model to corresponding features and the query. For example, item ranking computing device 102 may apply a relevance model to corresponding portions of the generated features and the query to generate a relevance score for each of the plurality of items. At step 710, matching attributes for each of the plurality of items are determined based on the item's corresponding item attributes and the query. For example, item ranking computing device 102 may determine, for each of the item attributes, if each item attribute matches with one or more terms contained within the query. Item ranking computing device 102 may generate an SR score based the number of matching attributes determined to match.

At step 712, the score for each of the plurality of items is adjusted based on the matching attributes. For example, item ranking computing device 102 may adjust the relevance score (e.g., determined in step 708) based on the number of matching attributes (e.g., determined in step 710). At step 714, the plurality of items are ranked based on the adjusted scores. For example, item ranking computing device 102 may generate ranked search results 312 identifying the ranked items. At step 716, the ranking is stored in a data repository. For example, item ranking computing device 102 may store the ranked search results in database 116. The method then ends.

Figure 8:
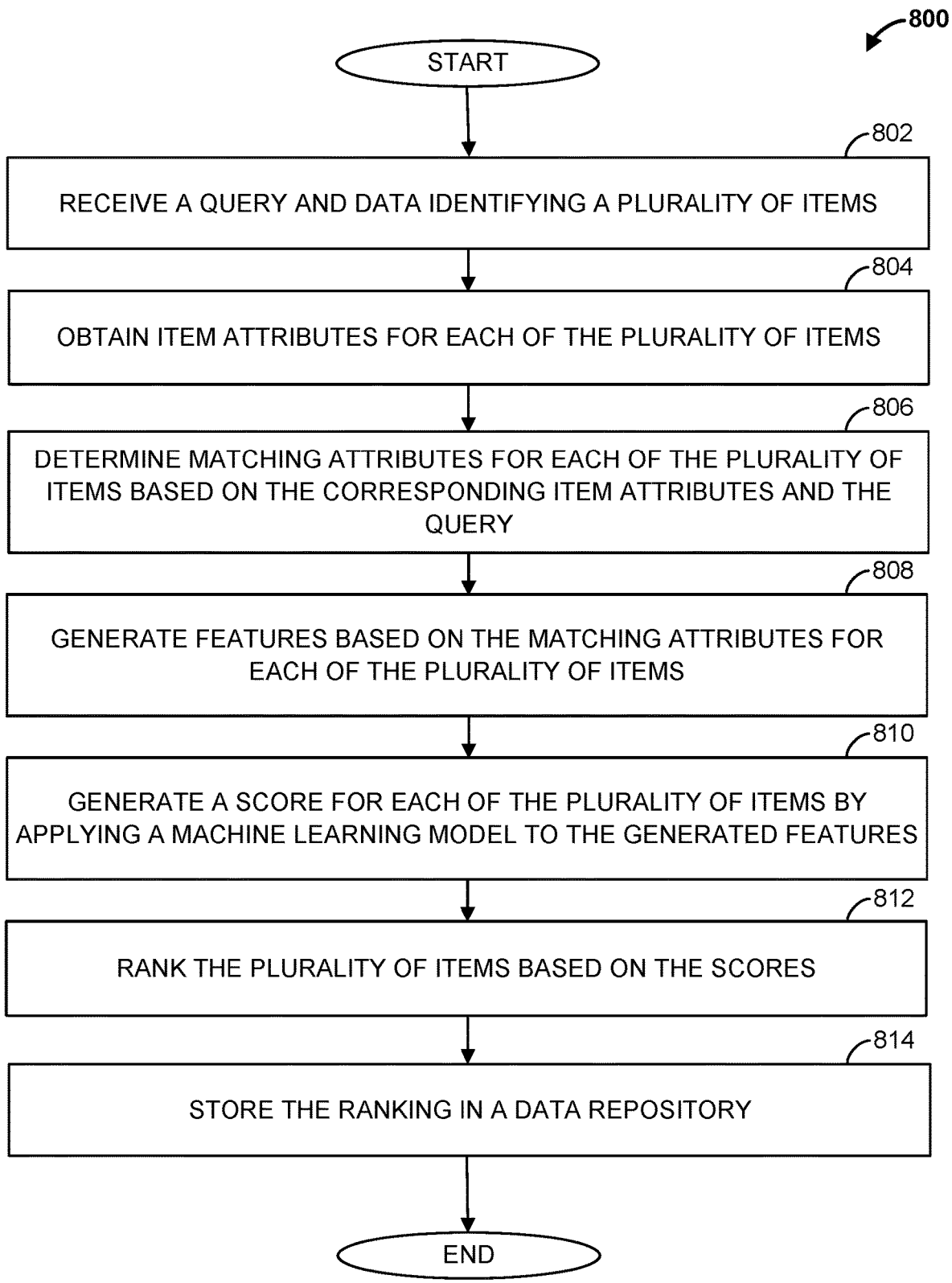
FIG. 8 is a flowchart of another example method that can be carried out by the item ranking system of FIG. 1 in accordance with some embodiments.

FIG. 8 is a flowchart of another example method 800 that can be carried out by the item ranking system 100 of FIG. 1. Beginning at step 802, a computing device, such as item ranking computing device 102, receives a query and data identifying a plurality of items. For example, item ranking computing device 102 may receive search request 310, which identifies a search query, and may also receive search request recommended item data 395 identifying the plurality of items. At step 804, item attributes for each of the plurality of items are obtained. For example, item ranking computing device 102 may retrieve item attributes for each item from catalog data 370 stored in database 116.

Proceeding to step 806, matching attributes for each of the plurality of items are determined based on the item's corresponding item attributes and the query. For example, item ranking computing device 102 may determine, for each of the item attributes, if each item attribute matches with one or more terms contained within the query. At step 808, features are generated based on the matching attributes for each of the plurality of items. For example, SRS model engine 404 may generate SR scores 405 based on the number of matching attributes. The features may include corresponding query item pair data labelled with a corresponding SR score.

At step 810, a score is generated for each of the plurality of items by applying a machine learning model to the generated features. For example, relevance model engine 402 may apply a relevance model to SR scores 405 generated by SRS model engine 404 to generate relevance scores 403.

At step 812, the plurality of items are ranked based on the adjusted scores. For example, item ranking computing device 102 may generate ranked search results 312 identifying the ranked items. At step 814, the ranking is stored in a data repository. For example, item ranking computing device 102 may store the ranked search results in database 116. The method then ends.

Figure 9:
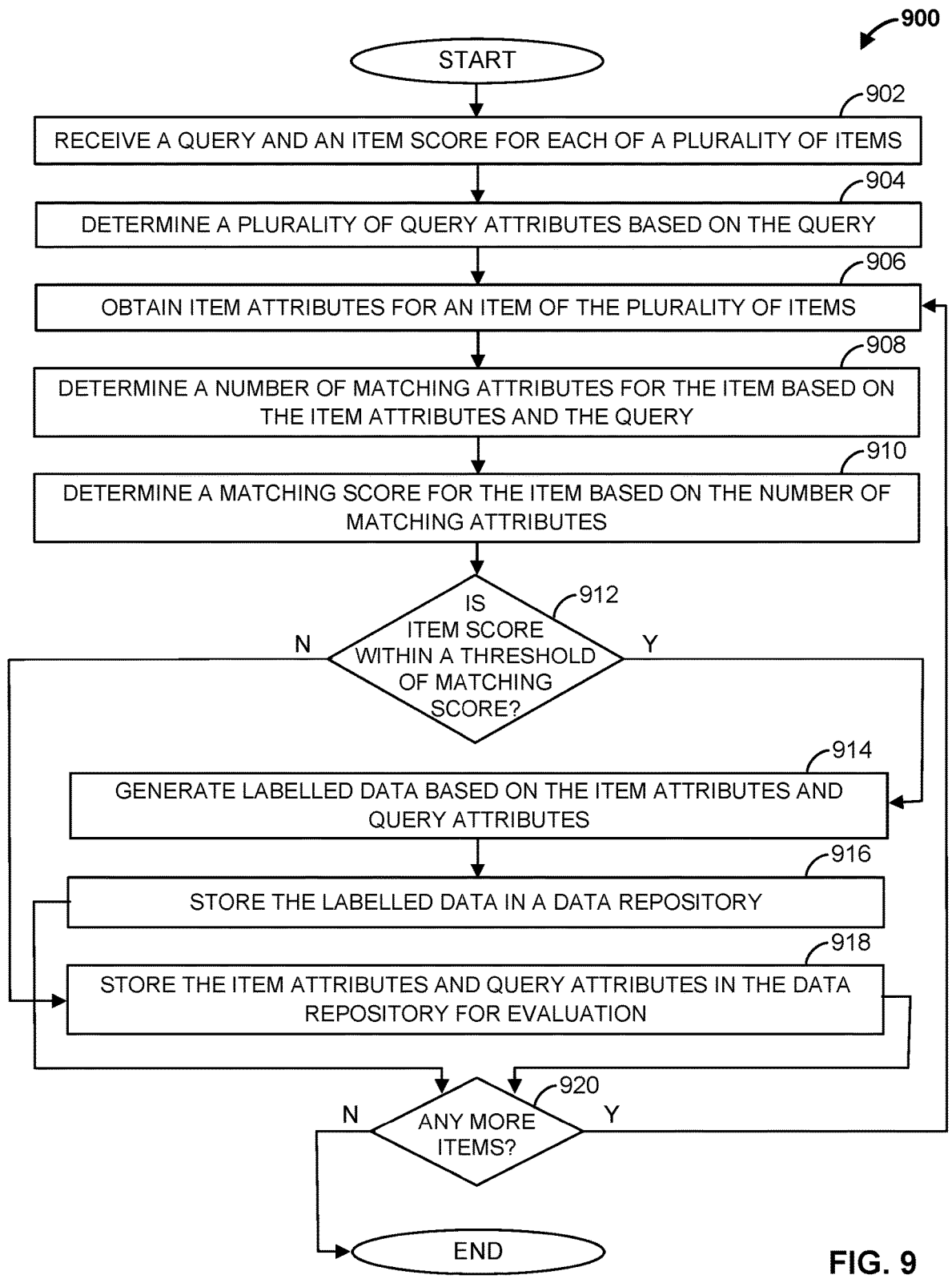
FIG. 9 is a flowchart of yet another example method that can be carried out by the item ranking system of FIG. 1 in accordance with some embodiments.

FIG. 9 is a flowchart of another example method 900 that can be carried out by the item ranking system 100 of FIG. 1. Beginning at step 902, a computing device, such as item ranking computing device 102, receives a query and an items core for each of a plurality of items. At step 904, a plurality of query attributes are determined based on the query. For example, item ranking computing device 102 may identify one or more of a brand, an age, a size, or any other suitable attribute contained within the query. At step 906, item attributes for an item of the plurality of items are obtained (e.g., from catalog data 370 stored in database 116).

Proceeding to step 908, a number of matching attributes are determined for the item based on the item attributes and the query attributes. For example, item ranking computing device 102 may determine a number of matching attributes as described above with respect to FIG. 5A or 5B. At step 910, a matching score for the item is determined based on the number of matching attributes. For example, item ranking computing device 102 may generate an SR score as described above with respect to FIG. 5A or 5B based on the number of matching attributes.

At step 912, a determination is made as to whether the item score is within a threshold of the matching score. The threshold may be predefined and configurable by a user. If, for the item, the item score is within the threshold of the matching score, the method proceeds to step 914, where labelled data is generated based on the item attributes and the query attributes. For example, item ranking computing device 102 may generate query item pair data labelled with a corresponding SR score. The method then proceeds to step 916, where the labelled data is stored in a data repository, such as database 116. The method then proceeds to step 920.

If, at step 912, the item score is not within the threshold of the matching score, the method proceeds to step 918, where the item attributes and the query attributes are stored in the data repository for evaluation. In some examples, item ranking computing device 102 may generate an evaluation request 603 identifying the stored item attributes and the query attributes. The method then proceeds to step 920.

At step 920, a determination is made as to whether any more items of the plurality of items remain. If there are any additional items, the method proceeds back to step 906, where item attributes are obtained for the item. Otherwise, if no more items remain, the method ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a database; and
a computing device communicatively coupled to the database, the computing device configured to:
receive a query and data identifying a plurality of items;
obtain, from the database, first item attributes for each of the plurality of items;
generate a semantic relevancy score for each of the plurality of items by applying a first machine learning model to corresponding first item attributes and the query, wherein the first machine learning model is configured to combine a plurality of attribute scores, wherein at least one of the plurality of attribute scores is determined by matching attributes for each of the plurality of items based on a textual comparison between the corresponding first item attributes and the query, and wherein the first machine learning model is generated from search query-item pair data labelled with a corresponding semantic relevancy score;
generate a blended relevancy score by combining the semantic relevancy score and a search relevancy score of each of the plurality of items;
generate ranking data based on the blended relevancy score for each of the plurality of items;
determine an alignment of the ranking data of the plurality of items with a previously generated ranking of the plurality of items based on the query applied by the first machine learning model previously, wherein the alignment is representative of ranking positions in the ranking data of the plurality items as compared to ranking positions in the previously generated ranking;
generate updated search query-item pair data for a corresponding one of the plurality of items when the alignment is less than a predetermined threshold, wherein the updated search query-item pairs are stored in a labelled corpus comprising data structures stored in the database including search query-item pairs labelled with the generated semantic relevancy score; and
generate a second machine learning model configured to combine a plurality of attribute scores, wherein the second machine learning model is trained, in part, from the labelled corpus.

2. The system of claim 1, wherein matching attributes for each of the plurality of items based on the textual comparison comprises:
determining a first number of the first item attributes that match the query;
determining a second number of the first item attributes that do not match the query; and
generating a matching score based on the first number of the first item attributes and the second number of the first item attributes; and adjusting the semantic relevancy score based on the matching score.

3. The system of claim 2, wherein generating the semantic relevancy score based on the matching score comprises increasing the semantic relevancy score if the first number is greater than the second number, and decreasing the semantic relevancy score if the first number is less than the second number.

4. The system of claim 1, wherein determining the matching attributes for each of the plurality of items based on the textual comparison comprises:
   tagging terms within the query;
   determining whether each of the tagged terms matches to first item attributes for each of the plurality of items; and
   generating a matching score based on a number of matched tagged terms.

5. The system of claim 4, wherein the first item attributes comprise a product type and a product type descriptor.

6. The system of claim 1, wherein the search relevancy score is a discretized relevancy score, and wherein generating the blended relevancy score of each of the plurality of items comprises:
   receiving an initial relevancy score of each of the plurality of items;
   generating the discretized relevancy score by normalizing and discretizing the initial relevancy score; and
   averaging the semantic relevancy score and the discretized relevancy score to generate the blended relevancy score.

7. The system of claim 1, wherein the ranking data is generated based on the blended relevancy score and an engagement score, wherein the engagement score is generated by an engagement model configured to receive the query, the data identifying the plurality of items, and session data related to the query.

8. The system of claim 7, wherein the computing device is configured to:
   identify a relevance bucket from a plurality of relevance buckets based on the search relevancy score;
   select the engagement model from a plurality of engagement models, wherein the engagement model is selected based on the relevance bucket; and
   modify the semantic relevancy score based on the engagement score prior to generating the blended relevancy score.

9. The system of claim 1, wherein the ranking data comprises first ranking data, and wherein the threshold score is indicative of alignment between the first ranking data and second ranking data, wherein the second ranking data is generated by a third machine learning model.

10. The system of claim 1, wherein the threshold score is indicative of a number of matching attributes for each of the plurality of items and the query.

11. A method by at least one processor, the method comprising:
   receiving a query and data identifying a plurality of items;
   obtaining, from a database, first item attributes for each of the plurality of items;
   generating a semantic relevancy score for each of the plurality of items by applying a first machine learning model to corresponding first item attributes and the query, wherein the first machine learning model is configured to combine a plurality of attribute scores, wherein at least one of the plurality of attribute scores is determined by matching attributes for each of the plurality of items based on a textual comparison between the corresponding first item attributes and the query, and wherein the first machine learning model is generated from search query-item pair data labelled with a corresponding semantic relevancy score;
   generating a blended relevancy score by combining the semantic relevancy score and a search relevancy score of each of the plurality of items;
   generating ranking data based on the blended relevancy score for each of the plurality of items;
   determining an alignment of the ranking data of the plurality of items with a previously generated ranking of the plurality of items based on the query applied by the first machine learning model previously, wherein the alignment is representative of ranking positions in the ranking data of the plurality items as compared to ranking positions in the previously generated ranking;
   generating updated search query-item pair data for a corresponding one of the plurality of items when the alignment is less than a predetermined threshold, wherein the updated search query-item pairs are stored in a labelled corpus comprising data structures stored in the database including search query-item pairs labelled with the generated semantic relevancy score; and
   generating a second machine learning model configured to combine a plurality of attribute scores, wherein the second machine learning model is generated, in part, from the labelled corpus.

12. The method of claim 11, wherein matching attributes for each of the plurality of items based on the textual comparison comprises:
   determining a first number of the first item attributes that match the query;
   determining a second number of the first item attributes that do not match the query;
   generating a matching score based on the first number of the first item attributes and the second number of the first item attributes; and
   adjusting the semantic relevancy score based on the matching score.

13. The method of claim 11, wherein matching attributes for each of the plurality of items based on the textual comparison comprises:
   tagging terms within the query;
   determining whether each of the tagged terms matches to first item attributes for each of the plurality of items; and
   generating a matching score based on a number of matched tagged terms.

14. The method of claim 11, wherein the ranking data is generated based on the blended relevancy score and an engagement score, and wherein the engagement score is generated by an engagement model configured to receive the query, the data identifying the plurality of items, and session data related to the query.

15. The method of claim 14, comprising:
   identifying a relevance bucket from a plurality of relevance buckets based on the search relevancy score;
   selecting the engagement model from a plurality of engagement models, wherein the engagement model is selected based on the relevance bucket; and
   modifying the semantic relevancy score based on the engagement score prior to generating the blended relevancy score.

16. A non-transitory computer readable medium having instructions stored thereon, wherein the instructions, when executed by at least one processor, cause a device to perform operations comprising:

receiving a query and data identifying a plurality of items;
obtaining, from a database, first item attributes for each of the plurality of items;
generating a semantic relevancy score for each of the plurality of items by applying a first machine learning model to corresponding first item attributes and the query, wherein the first machine learning model is configured to combine a plurality of attribute scores, wherein at least one of the plurality of attribute scores is determined by matching attributes for each of the plurality of items based on a textual comparison between the corresponding first item attributes and the query, and wherein the first machine learning model is generated from search query-item pair data labelled with a corresponding semantic relevancy score;
generating a blended relevancy score by combining the semantic relevancy score and a search relevancy score of each of the plurality of items;
generating ranking data based on the blended relevancy score for each of the plurality of items;
determining an alignment of the ranking data of the plurality of items with a previously generated ranking of the plurality of items based on the query applied by the first machine learning model previously, wherein the alignment is representative of ranking positions in the ranking data of the plurality items as compared to ranking positions in the previously generated ranking;
generating updated search query-item pair data for a corresponding one of the plurality of items when the alignment is less than a predetermined threshold, wherein the updated search query-item pairs are stored in a labelled corpus comprising data structures stored in the database including search query-item pairs labelled with the generated semantic relevancy score; and
generating a second machine learning model configured to combine a plurality of attribute scores, wherein the second machine learning model is generated, in part, from the labelled corpus.

17. The non-transitory computer readable medium of claim 16, further comprising instructions stored thereon that, when executed by at least one processor, further cause the device to perform operations comprising:
determining a first number of the first item attributes that match the query;
determining a second number of the first item attributes that do not match the query;
generating a matching score based on the first number of the first item attributes and the second number of the first item attributes; and
adjusting the semantic relevancy score based on the matching score.

18. The non-transitory computer readable medium of claim 16, further comprising instructions stored thereon that, when executed by at least one processor, further cause the device to perform operations comprising:
tagging terms within the query;
determining whether each of the tagged terms matches to first item attributes for each of the plurality of items; and
generating a matching score based on a number of matched tagged terms.

19. The non-transitory computer readable medium of claim 16, wherein the ranking data is generated based on the blended relevancy score and an engagement score, wherein the engagement score is generated by an engagement model configured to receive the query, the data identifying the plurality of items, and session data related to the query.

20. The non-transitory computer readable medium of claim 19, further comprising instructions stored thereon that, when executed by at least one processor, further cause the device to perform operations comprising:
identifying a relevance bucket from a plurality of relevance buckets based on the search relevancy score;
selecting the engagement model from a plurality of engagement models, wherein the engagement model is selected based on the relevance bucket; and
modifying the semantic relevancy score based on the engagement score prior to generating the blended relevancy score.

* * * * *